(12) United States Patent
Delpier et al.

(10) Patent No.: US 8,079,867 B2
(45) Date of Patent: Dec. 20, 2011

(54) PORT ATTACHED TO FLEXIBLE MOUNT

(75) Inventors: Michael Delpier, Houston, TX (US);
Dustin L. Hoffman, Cypress, TX (US);
Peter M. On, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/634,375

(22) Filed: Dec. 9, 2009

(65) Prior Publication Data
US 2011/0136355 A1 Jun. 9, 2011

(51) Int. Cl.
*H01R 13/60* (2006.01)
(52) U.S. Cl. ....................................................... 439/528
(58) Field of Classification Search ............... 439/528, 439/131
See application file for complete search history.

(56) References Cited

U.S. PATENT DOCUMENTS

| | | | |
|---|---|---|---|
| 5,616,050 A | 4/1997 | Suski | |
| 6,058,089 A * | 5/2000 | Youens et al. | 720/652 |
| 6,386,908 B2 * | 5/2002 | Kato et al. | 439/528 |
| 6,681,991 B1 * | 1/2004 | Li | 235/439 |
| 6,705,890 B2 * | 3/2004 | Kitou et al. | 439/528 |
| 6,722,917 B2 * | 4/2004 | Huang | 439/501 |
| 7,104,816 B1 * | 9/2006 | Wang | 439/136 |
| 7,300,306 B2 * | 11/2007 | Le et al. | 439/502 |
| 2004/0089571 A1 * | 5/2004 | Lin | 206/320 |
| 2007/0115623 A1 * | 5/2007 | Shih | 361/683 |
| 2009/0130875 A1 * | 5/2009 | Guo | 439/141 |

* cited by examiner

*Primary Examiner* — Phuong Dinh
(74) *Attorney, Agent, or Firm* — Reed J. Hablinski

(57) ABSTRACT

A system including a flexible mount that can be coupled to a computing device. A port can be attached to the flexible mount. The flexible mount can conform to the chassis of the computing device.

20 Claims, 3 Drawing Sheets

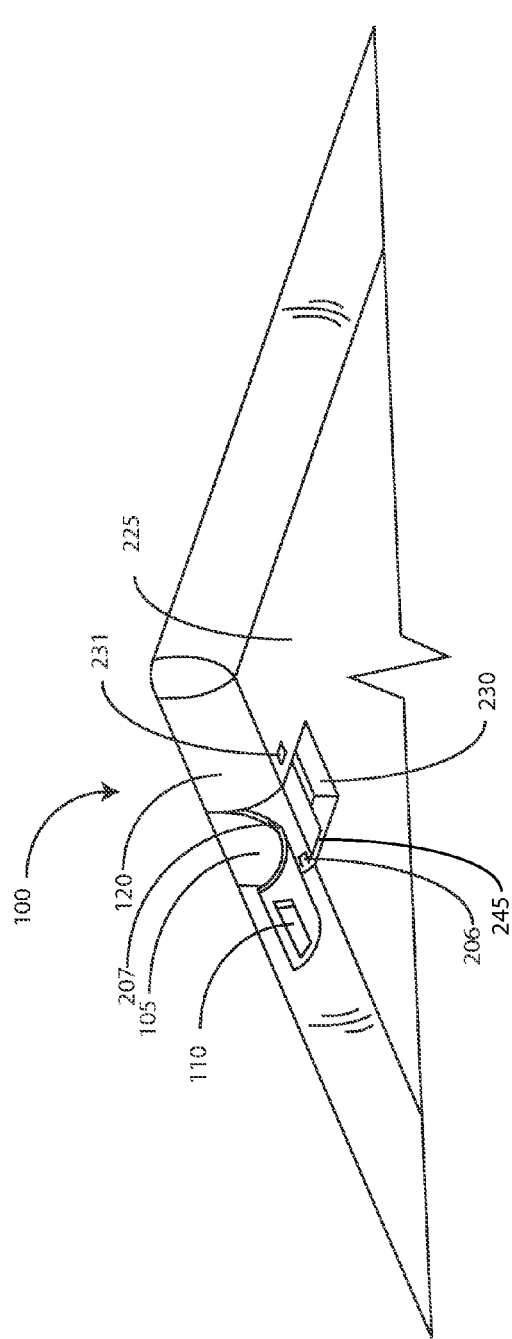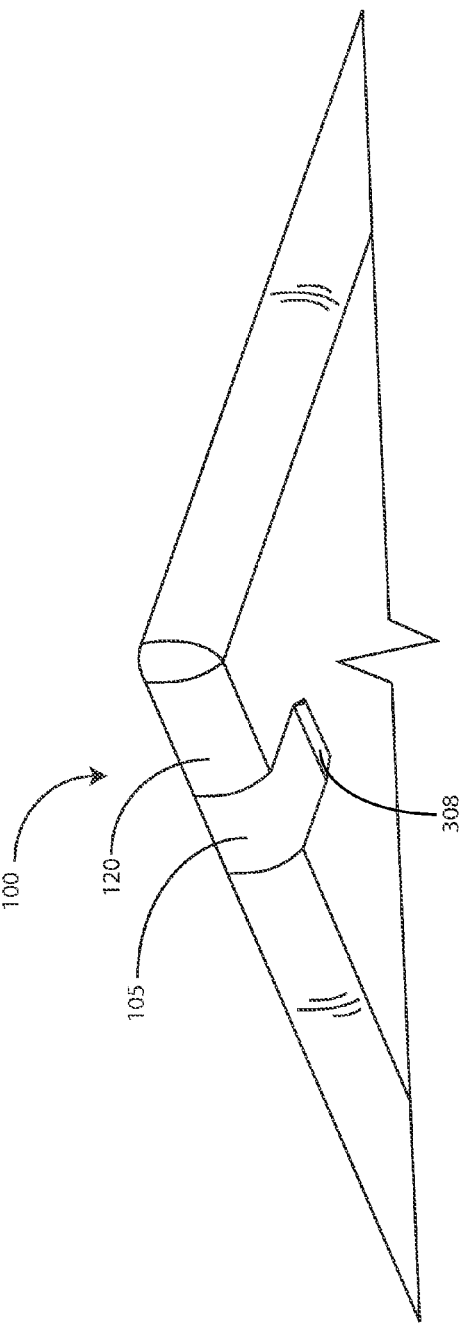

PORT ATTACHED TO FLEXIBLE MOUNT

BACKGROUND

As computing devices such as portable computers, personal digital assistants, and telephones become smaller the ports that are used to connect peripherals to the computing devices have to be redesigned to fit in the chassis of the computing device. Ports that are used in a computing device may be based on a set of specifications issued by a standard setting body. The specifications of a port allow a manufacturer of a computing device or a peripheral to know things such as the physical dimensions of the port, electrical specifications and the protocol that the port uses to communicate. A change in the port design may be one of just physical dimensions. In some cases a change in physical dimensions may require a change in electrical specifications as well. A redesign of the port may prevent peripherals that do not use the redesigned port from connecting to the computing devices.

BRIEF DESCRIPTION OF THE DRAWINGS

Some embodiments of the invention are described with respect to the following figures:

FIG. 2 is a system according to an example embodiment of the invention;

FIG. 3 is a system according to an example embodiment of the invention;

DETAILED DESCRIPTION

As computing devices get smaller ports that may be found on a computing device may be removed, redesigned or may be mounted in ways that may not allow all peripherals to connect to the ports. For example as portable computers become smaller the external video port may be included in the computer but the connector for the peripheral may not be able to connect properly to the port. For example, a Dsub connector for video may be thicker than the thickness of the computing device and cause the computing device to be supported by the Dsub connector and not properly by the chassis of the computing device. The connectors may not be designed to support the weight of the computing device and may cause damage to the computing device. If the port is supporting the weight of the computing device, the weight may cause the connection between the port and the circuit board to be damaged or may cause the port itself to be deformed. If the port is not rigidly included in the computing device, the computing device may include the port and not be damaged by pressure on the port.

In one embodiment a removable dongle can be used as an adapter to couple a peripheral to a computing device where the peripheral and the computing device do not share a common connector. For example some dongles have an RJ45 port on one end and a proprietary port on the other end to connect to a computing device. The dongle is separate from the computing device and does not have a place in the computing device to store the dongle. If the dongle is not stored in the computing device then the dongle may not be available if a peripheral that cannot connect to the computing device without the dongle is trying to be connected to the computing device.

The computing device may have curved or angled sides for an esthetic reason or for ease of use in placing a computing device in a case or removing a computing device from a case. The ports that may be included in the computing device are not curved or angled. To mount a port that is not curved or angled into a computing device with a curved or angled side a porch is used. The porch is an extension from the side of the computing device to create a flat surface for mounting the port.

In one embodiment a system includes a flexible mount coupled to a computing device. A connector can be attached to the flexible mount. The flexible mount can conform to the chassis of the computing device. Conforming to the chassis of the computing device the flexible mount can remain on the computing device when not in use and still not be damaged by hitting the device against something if the computing device is being transported.

Figure 1:
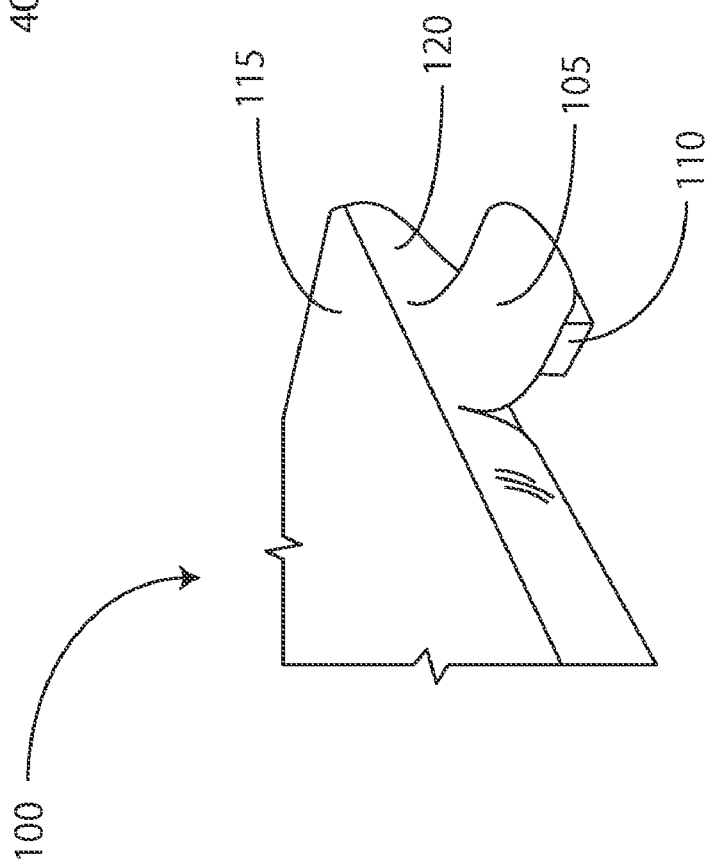
FIG. 1 is a system according to an example embodiment of the invention.

With reference to the figures, FIG. 1 is a portion of a system according to an example embodiment of the invention. The computing device 100 includes a chassis 120. The chassis includes a top 115. A flexible mount 105 can be attached to the chassis of the computing device 100. The flexible mount 105 can include a port 110. The port 110 may be for example a Dsub connector, an RJ45, an RJ11, USB, IEEE 1394, eSata or another port. The flexible mount 105 may be for example rubber, plastic, fabric, or another flexible material. The flexible mount can have resiliency so that the flexible mount can be manipulated, such as folding, and return to the shape of the flexible mount prior to being manipulated. A Dsub connector may be used, for example, as a VGA video port. A VGA connector may have dimensions of 7.90 mm in height and 16.33 mm in length and 6.73 mm in depth. If the height of a port is restricting the height of the side of a computer then the port can be mounted to the flexible mount and stored in the bottom, of the computing device so that the height of the port is not restricting the height of the chassis of the computing device.

The electrical connection from the port 110 to the computing device can be through conductors embedded in the flexible mount 105. The embedded conductors are enclosed in flexible mount 105. The flexible mount may be removable from the system to be replaced if damaged or in some embodiments to change the type of connector that is attached to the flexible mount. For example the computing device may have conductors that support more than one type of connector at the location where the flexible mount attaches to the computing device. If a flexible mount that includes a USB port attached can connect to a first set of conductors and a flexible mount that includes an IEEE 1394 port attached can connect to a second set of conductors in the computing device. The connector can be attached to the same side of the flexible mount as the computing device is attached or in an alternative embodiment the connector can be attached to the opposite side of the flexible mount. If the connector is on the same side as the flexible mount of the computing device the computing device can include a cavity to store the connector.

FIG. 2 is a portion of a system according to an example embodiment of the invention. The portion depicted may be an alternative view of the computing device depicted in FIG. 1. The computing device 100 can include a cavity 230 to store the connector within the chassis 120 of the computing device 100 and may be in the bottom 225 of the chassis 120 for example. In one embodiment the cavity 245 can receive the flexible mount 105. The flexible mount cavity 245 may allow the flexible mount 105 to be flush with the chassis 120 of the computing device if the port 110 is stored in the cavity 230. The depth of the flexible mount cavity 245 may be dependent on the flexible mount 105 and the depth of cavity 230 may be dependent on the physical dimensions of the port 110. For example if the flexible mount 105 is 2 millimeters in thickness and the flexible mount cavity 245 may be 2 millimeters in depth. If the port is 10 millimeters in thickness the cavity 230 may be at least 10 millimeters in depth for example.

In one embodiment the cavity 230 may have a retaining system. For example the cavity may have a mechanical system that locks the port 110 into the cavity if a force is applied to the flexible mount 105 and unlocks the port 110 from the cavity 230 if force is applied to the flexible mount 105 when the connector is in the cavity 230. The mechanical system may also include an ejection device that pushes the port 110 out of the cavity 230 if the port 110 is in the cavity 230 and a force is applied to the flexible mount 105. The retaining system may be a material that allows the connector to be inserted into the cavity and provide resistance to the connector being removed from the cavity, for example the material could be rubber that may be attached to the sides of the cavity 230 and contact the port 110 if the port 110 is in the cavity 230. The rubber may create a friction that does not allow the port 110 to come out of the cavity by the force of gravity but an additional force can overcome the friction and remove the connector 110 from the cavity 230. In another embodiment the computing device 100 includes a button 231 that if pressed removes the port 110 from the cavity 230.

In one embodiment the cavity 230 to receive the flexible mount 105 may have ears 206 extending from the sides of the cavity 230. In one embodiment the ears 206 can be aligned with slots 207 in the flexible mount 105. The ears 206 can be inserted in the slots 207. If the ears 206 are inserted in the slots 207 in the flexible mount 105 the ears 206 can cause the flexible mount 105 to be retained in the cavity 230. In one embodiment the ears can be on the flexible mount 105 and the slot can be on the side of the cavity 230. In one embodiment the ear 206 or the slot 207 may extend the entire length of the flexible mount 105 or the cavity 230 or any portion of the flexible mount 105 or the cavity 230. In one embodiment the ears 206 are made of a rigid material and the flexible mount 105 flexes to insert the ears 206 into the slots 207. In one embodiment the ears 206 are on the flexible mount 105 and the ears flex to be inserted in the slots 207 on the side of the cavity 230.

FIG. 3 is a portion of a system according to an example embodiment of the invention. The computing device 100 can include a flexible mount 105. The depth of the flexible mount 105 and the depth of the cavity can determine if the flexible mount 105 is substantially flush with the chassis 120 of the computing device 100. For example if the depth of the flexible mount 105 is 2 mm and the depth of the cavity 230 is 2 mm then the flexible mount is substantially flush with the chassis. Differences in the depth of the flexible mount 105 or the cavity 230 can cause the flexible mount 105 to be recessed into or protrude from the chassis 120 of the computing device 100. If the flexible mount 105 is substantially flush with the computing device 100, a tab 308 may be used to apply a force to the flexible mount 105 to remove the flexible mount 105 from a stored position within the chassis 120. The tab 308 may be for example an extension of the flexible mount 105 that is not flush with the chassis 120. In one embodiment the tab 308 may not be substantially flush with the chassis if the chassis 120 does not have a cavity to contain the tab 308. In one embodiment the tab 308 may be made from a different material than the flexible mount 105. The tab 308 may be for example metal or plastic. In one embodiment the metal tab may be magnetized to or may be a magnetic material to allow the tab 308 to be removably connected to the chassis of the computing device so that the connector is stored in the cavity. The tab 308 may include an opening to assist a user in gripping the tab 308 and applying force to the tab to remove a port from a cavity. The tab 308 may include a concave or convex surface to assist the user in removing the flexible mount from a cavity.

If the flexible mount 105 is substantially flush with the chassis of the computing device 100 the flexible mount 105 may be less likely to get caught on another object and be pulled away from the chassis 120 of the computing device 100. In one embodiment the exposed surface of the flexible mount may have a coefficient of friction that reduces the changes of the flexible mount getting caught on something. In one embodiment, the flexible mount has a coating on it to provide an exposed surface with a different coefficient of friction than that of the flexible mount material. In one embodiment, the coefficient of friction of the flexible mount is substantially the same as the chassis of the computing device 100.

Figure 4:
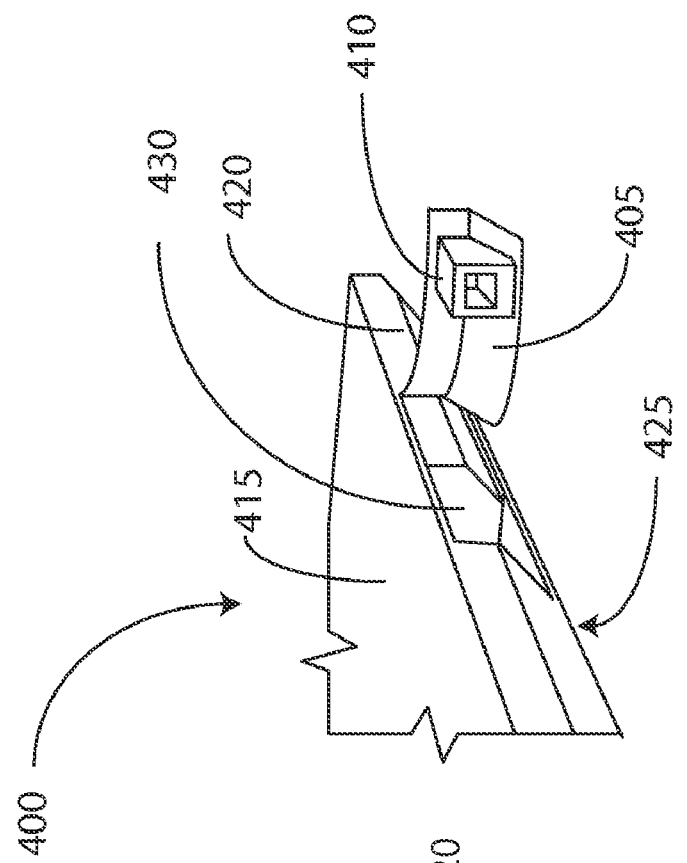
FIG. 4 is a system according to an example embodiment of the invention.

FIG. 4 is a portion of a system according to an example embodiment of the invention. The computing device 400 can include a flexible mount 405. In one embodiment the flexible mount 405 can be attached to the chassis 420 of the computing device 400 between the top 415 of the chassis 420 and the bottom 425 of the chassis 420. The flexible mount 405 may have a port 410. The location that the flexible mount 405 is attached to the chassis 420 does affect the performance of the flexible mount 405. In some embodiments the location may be determined by the size of the connector that will attach to port 410 or may be determined by the size of the cavity 430 or the location of the cavity 430. For example if the cavity is in the top 415 or the bottom 425 of the chassis 420 of the computing device 400 the location that the flexible mount can be attached may be limited to being parallel with the top 415 or the bottom 425 of the chassis 420. The location of the cavity may be determined by the dimensions of the cavity 430.

The location of the flexible mount 405 may also depend on the location of the components inside the computing device 400. For example if the component is a controller for the port 410 that is attached to the flexible mount 405 then the flexible mount may be mounted in a way to reduce the distance between the controller and the flexible mount. Mounting the flexible mount closer and having more mounting options can save cost by not having to route the electrical connection between the controller and the flexible mount 405. The controller may be, for example, a video controller, an audio controller, a communications controller, a serial bus controller.

Figure 5:
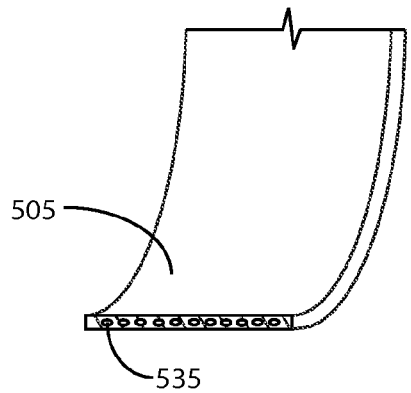
FIG. 5 is a cross section of a flexible mount according to an example embodiment of the invention.

FIG. 5 is a cross section of the flexible mount 505 according to an example embodiment of the invention. The flexible mount 505 may be made of rubber, flexible plastic, a fabric or another flexible material. The flexible mount 505 may have conductors 535, for example copper wires, embedded in the flexible mount 505. The conductors 535 may be electrical conductors, optical conductors or another way to connect to the port through conductors 535 embedded in the flexible mount 505. The conductors 535 can connect a port attached to the flexible mount to a controller in a computing device. In one embodiment the flexible mount 505 can protect the conductors 535 from abrasions or other types of damage. In one embodiment the flexible mount 505 provides insulation for the conductors 535 embedded in the flexible mount 505. In an alternative embodiment the conductors 535 may have an insulator that protects the conductors 535 and the insulator and the conductor 535 are embedded in the flexible mount 505.

In one embodiment the conductor can be a flex circuit. A flex circuit can be a flexible plastic substrate, such as polyimide that can be used to mount the connectors. Flex circuits may also be screen printed circuits on polyester, such as silver screen printed. The flexible plastic substrate may be embedded in the flexible mount to protect the flex circuit. The thickness of the flexible mount may be determined by the thickness of the embedded conductors.

Figure 6:
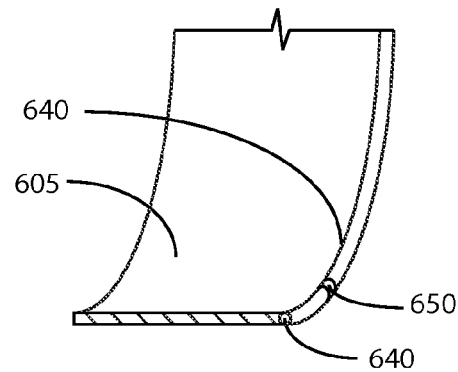
FIG. 6 is a cross section of a flexible mount according to an example embodiment of the invention.

FIG. 6 is a cross section of the flexible mount 605 according to an example embodiment of the invention. The flexible mount 605, in one embodiment, may have a conductor 640 attached to a surface 641 of the flexible mount 605. In one embodiment the conductor 640 may be multiple conductors, and the multiple conductors may be bundled together for example. The conductor 640 may be attached to the edge of the flexible mount 605 with an adhesive, may be attached with a fastener 650 or a sleeve. If the bundle of conductors 640 is attached to the edge of the flexible mount then a flexible mount 605 could be used for different ports and have a bundle of conductors that supports at least as many signals as are used by the port attached to the flexible mount 605.

Figure 7:
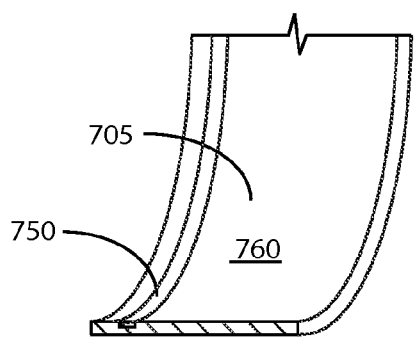
FIG. 7 is a cross section of a flexible mount according to an example embodiment of the invention.

FIG. 7 is a cross section of the flexible mount 705 according to an example embodiment of the invention. The flexible mount 705, in one embodiment, may have a resilient member 750 attached to the flexible mount 705. The resilient member 750 may be a metal or plastic spring for example. In one embodiment the resilient member 750 may be fully or partially embedded in the flexible mount 705. In one embodiment the resilient member 750 may be attached to the flexible mount 705 on a surface 760 of the flexible mount 705. The resilient member 750 may provide a force on the flexible mount 705. The force applied by the resilient member to the flexible mount 705 may cause the flexible mount 705 to have a similar shape to a portion of a chassis of a computing device, in one embodiment.

In another embodiment the force applied by the resilient member 750 may cause a port attached to the flexible mount to remain in a cavity in a computing device until a force is applied to the flexible mount that is more than the force created by the resilient member. In one embodiment the resilient member 750 is attached to the chassis of the computing device to provide the resilient member 750 a fixed base that can be used by the resilient 750 member to provide force to the flexible mount 705.

Figure 8:
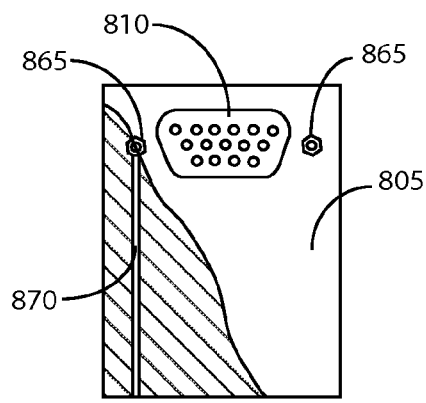
FIG. 8 is a cross section of a flexible mount according to an example embodiment of the invention.

FIG. 8 is a cross section of the flexible mount 805 according to an example embodiment of the invention. The flexible mount may have a fastener 865 that may be connected to the computing device by a reinforcement 870. The fastener can be, for example, threaded to connect to a connector of a peripheral device and the reinforcement can prevent damage to the flexible mount. In another embodiment the fastener may be in the port to hold a spring clip, for example the spring clip on an RJ45 connector. For example if the peripheral device is an external monitor the fasteners may be connected to the connector of the monitor by screwing the connector into the fasteners and if the computing device was moved without the connector for the monitor being disconnected from the fasteners and removed from the port 810 the reinforcement 870 may prevent the flexible mount 805 from being damaged. For example the flexible mount may tear or stretch causing the flexible mount to no longer fit in the cavity or may cause a conductor to be disconnected from a controller, the port, or a conductor may be separated somewhere between the controller and the port if a conductor is stretched.

In one embodiment a reinforcement may be embedded in the flexible mount for strength. The reinforcement may be made of metal, plastic, or another fiber that provides strength to the flexible mount to prevent damage to the flexible mount. In another embodiment the fastener may be removed from the flexible mount by a force that is less than the force that may damage the flexible mount. If the fasteners are removed the fasteners may be reattached or replaced, in one embodiment.

Figure 9:
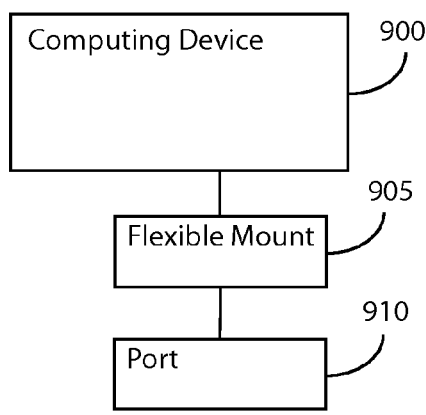
FIG. 9 is a system according to an example embodiment of the invention.

FIG. 9 is a system according to an example embodiment of the invention. The computing device 900 may be connected to a flexible mount 905. The flexible mount 905 maybe connected to a port 910. The flexible mount 905 may conform to the chassis of the computing device 900. If the flexible mount 905 conforms to the chassis of the computing device the flexible mount 905 may be curved for example to follow the contours of the chassis of the computing device 900. In one embodiment a conductor is connected between the computing device 900 and the port 910. The conductor may be embedded in the flexible mount 905 or may be attached to the surface.

Figure 10:
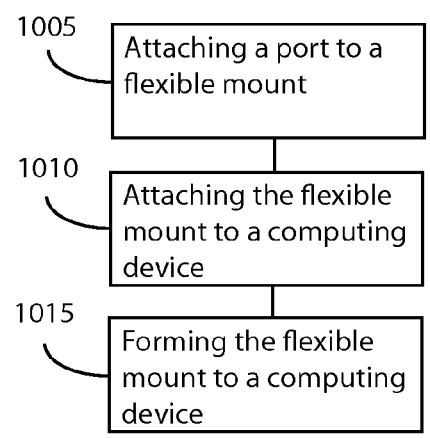
FIG. 10 is a method according to an example embodiment of the invention.

FIG. 10 is a method according to an example embodiment of the invention. The method includes attaching a port to a flexible mount at 1005. The flexible mount can be attached to a computing device at 1010. The flexible mount can be formed to the computing device at 1015. The attachment at 1005, the attachment at 1010 and the forming at 1015 may be performed in any order. In one embodiment to form the flexible mount to the computing device a resilient member may be attached to the flexible mount by fully or partially embedding the resilient member in the flexible mount. In another embodiment, the resilient member may also be attached to the surface of the flexible mount. Conductors may also be embedded in the flexible mount or conductors may be attached to a surface of the flexible mount.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A portable computer comprising:
    a flexible mount attached to a portable computer;
    a port attached to a side of the flexible mount and to receive a connection from a peripheral; and
    wherein the flexible mount conforms to the chassis of the portable computer.

2. The system of claim 1, further comprising a cavity in the portable computer to store the flexible mount.

3. The system of claim 1, further comprising a conductor attached to an edge of the flexible mount wherein the conductor is connected to a controller in the portable computer and is connected to the port.

4. The system of claim 1, further comprising a conductor embedded in the flexible mount wherein the conductor is connected to a controller in the portable computer and is connected to the port.

5. The system of claim 1, further comprising a flexible substrate embedded in the flexible mount wherein the flexible substrate is connected to a controller in the portable computer and is connected to the port.

6. The system of claim 1, further comprising a controller connected to the port.

7. The system of claim 1, further comprising a reinforcement embedded in the flexible mount.

8. The system of claim 1, further comprising fasteners attached to the flexible mount.

9. The system of claim 1, further comprising a flexible plastic substrate to prevent damage to a conductor connected to the port.

10. The system of claim 1, further comprising a cavity in the side of the portable computer for the port.

11. The system of claim 10, further comprising a resilient member to exert force on the flexible mount to keep the port in the cavity.

12. A portable computer comprising:
a flexible mount coupled to the exterior of a portable computer;
a port attached to a side of the flexible mount and to receive a connection from a peripheral; and
a conductor connected to the port.

13. The system of claim 12, wherein the conductor is embedded in the flexible mount.

14. The system of claim 12, further comprising a cavity in the side of the computer for the flexible mount.

15. The system of claim 12, further comprising a cavity in the portable computer to store the port.

16. The system of claim 12, further comprising a controller connected to the conductor to send signals to the port.

17. A method comprising:
attaching a port to a side of a flexible mount;
attaching the flexible mount to a portable computer; and
forming the flexible mount to the portable computer.

18. The method of claim 17 further comprising attaching a resilient member to the flexible mount for forming the flexible mount.

19. The method of claim 18 further comprising embedding a conductor in the flexible mount, 20. The method of claim 17 further comprising attaching a conductor to the side of the flexible mount.

* * * * *

UNITED STATES PATENT AND TRADEMARK OFFICE
CERTIFICATE OF CORRECTION

PATENT NO. : 8,079,867 B2  Page 1 of 1
APPLICATION NO. : 12/634375
DATED : December 20, 2011
INVENTOR(S) : Michael Delpier et al.

It is certified that error appears in the above-identified patent and that said Letters Patent is hereby corrected as shown below:

In column 8, line 20, in Claim 19, delete "mount," and insert -- mount. --, therefor.

Signed and Sealed this
Twenty-sixth Day of March, 2013

Teresa Stanek Rea
*Acting Director of the United States Patent and Trademark Office*